(12) United States Patent
Knapp

(10) Patent No.: US 6,370,965 B1
(45) Date of Patent: Apr. 16, 2002

(54) CAPACITIVE SENSING ARRAY DEVICES

(75) Inventor: Alan G. Knapp, Crawley (GB)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/668,548

(22) Filed: Sep. 25, 2000

(30) Foreign Application Priority Data

Sep. 24, 1999 (GB) ............................................. 9922572

(51) Int. Cl.$^7$ ................................................. G01D 7/00
(52) U.S. Cl. ..................................... 73/862.046; 73/780
(58) Field of Search ...................... 73/862.046, 862.041, 73/862.337, 862.52, 780

(56) References Cited

U.S. PATENT DOCUMENTS

| | | | |
|---|---|---|---|
| 5,325,442 A | 6/1994 | Knapp | 382/4 |
| 5,852,480 A | * 12/1998 | Yajima et al. | 349/40 |
| 6,055,324 A | * 4/2000 | Fujieda | 382/124 |

FOREIGN PATENT DOCUMENTS

| | | | |
|---|---|---|---|
| DE | 19901384 A | 7/2000 | H01L/23/60 |
| EP | 0902387 A2 | 3/1999 | G06K/9/20 |
| WO | WO9740744 | 11/1997 | A61B/5/117 |
| WO | WO9849691 | 11/1998 | H01B/7/004 |

* cited by examiner

Primary Examiner—Max Noori
(74) Attorney, Agent, or Firm—Aaron Waxler

(57) ABSTRACT

A capacitive sensing array device, particularly a fingerprint sensing array device, includes an array of sense electrodes covered by a layer of dielectric material defining a sensing surface over which, for example, a person's finger is placed in use. Grounding conductors are provided adjacent the sensing surface and extending alongside one or more edges of the sense electrodes. The material of the dielectric layer in the region of the grounding conductors at least has a non-linear I-V characteristic whereby electrostatic charges occurring in the device structure are conducted through this material to the grounding conductors. The grounding conductors may be buried in the dielectric layer and second electrodes provided on the sensing surface overlying respective sense electrodes and overlapping the grounding conductors.

11 Claims, 3 Drawing Sheets

CAPACITIVE SENSING ARRAY DEVICES

BACKGROUND OF THE INVENTION

The present invention relates to a capacitive sensing array device having a structure comprising an array of sense electrodes carried on a substrate and covered by a layer of dielectric material defining a sensing surface.

SUMMARY OF THE INVENTION

A device of the above described kind and intended for sensing capacitively fingerprint patterns in particular is described in U.S. Pat. No. 5,325,442. The device compares a plurality of sense elements arranged in a row and column matrix array. Each sense element consists of a sense electrode connected to an associated switching device in the form of, for example a thin film transistor, (TFT), and the switching devices of the array are connected to a peripheral drive circuit via sets of row and column address conductors carried on the substrate and extending between the sense electrodes. The drain electrode of each TFT is connected to the sense electrode of the sense element. When a finger is placed over the dielectric material, the sense electrodes together with the overlying layer of dielectric material and individual fingerprint portions constitute capacitors. The row address conductors are connected to a scan circuit which applies a selection signal to each row conductor in sequence to turn on the TFTs of the sense elements of the row. Simultaneously with a selection signal a potential is applied to the column address conductors to charge the capacitors. The individual capacitances of these capacitors depend on the spacing of the fingerprint portions from the sense electrodes, as determined by the presence of a ridge of a trough of the fingerprint, and are measured by sensing the charging current flowing in the column conductors during charging of the capacitors, using current or charge sensing amplifier circuits incorporated in the drive circuit. At the end of a row address period, the TFTs are turned off and a gating signal applied to the next row conductor to turn on the TFTs of the next row of sense elements. Each row of sense elements is addressed in this manner in turn and the variation in sensed capacitances produced over the array of sense elements by a fingerprint ridge pattern provides an electronic image or representation of the fingerprint pattern. In addition to the sensing element array being formed using thin film technology, with the transistors comprising thin film transistors (TFTs) on an insulating substrate for example of glass or plastics, the array may alternatively comprise an integrated circuit using a silicon substrate.

In a modification of one embodiment of fingerprint sensing device described in this specification, the structure includes metal grounding conductors provided on the surface of the dielectric layer and overlying the spaces between the sense electrodes, either in a grid pattern or as linear conductors, for the purpose of improving electrical contact to the finger surface.

In a separate embodiment also described, each sense element is provided with a second, electrically isolated, electrode on the surface of the dielectric layer which is of a similar size to the sensing electrode and arranged overlying the sense electrode. The second electrodes are intended in use to be contacted and grounded by ridges of a person's fingerprint placed thereon so as to define together with their underlying sense electrodes and intervening dielectric material substantially identical, and more distinctive, capacitors at the fingerprint ridge locations.

A similar kind of device to that discussed above, comprising an active matrix array with capacitive sensing electrodes but occupying a larger are and in which the pitch of the sense electrodes is increased could be used as a touch input device such as a graphics tablet, responsive to a person's finger or a stylus.

A problem with such capacitive sensing array devices is that an electrostatic charge from the body of a person touching the device or even bringing a finger into proximity to the sensing surface can cause damage, particularly to the switching devices which are susceptible to such charges.

It is an object of the present invention to provide an improved capacitive sensing array device which is less susceptible to damage being caused in this manner.

According to the present invention, there is provided a capacitive sensing array device of the kind described in the opening paragraph wherein grounding conductors are provided adjacent to the sensing surface and extending alongside at least one edge of each of the sense electrodes, and wherein the material of the dielectric layer at least at the region of the grounding conductors comprises a semi-insulating material having a non-linear current-voltage characteristic whereby electrostatic charges transferred to, or induced in, the device structure in use are conducted through the semi-insulating material to the grounding conductors.

The risk of damage being caused to the device, and especially components such as the switching devices (e.g. transistors) associated with the sense electrodes, through electrostatic charges carried by a person when touching, or bringing a body part into proximity with, the device is considerably reduced. The invention involves recognition that while the conductors on the sensing surface as described in U.S. Pat. No. 5,325,442 can serve to dissipate electrostatic charges carried on a person's finger when the finger touches the conductors, the behaviour, and particularly the position, of electrostatic discharges especially when a finger is being brought close to the device is highly unpredictable and because the area of the conductors is relatively small compared with the area occupied by the sense electrodes such charges can, for example, easily by-pass the conductors and pass through the dielectric layer to a sense electrode and from there to the switching devices. By using a highly non-linear material adjacent the grounding conductors, electrostatic charge effectively is encouraged to pass to a grounding conductor instead due to the behaviour of this material at higher voltages. As the potential between the grounding conductor and the region where the discharge occurs rises the impedance of this material therebetween falls, thereby allowing the charge to be conducted away in a controlled manner.

The highly non-linear semi-insulating material preferably comprises a non-stoichiometric (silicon-rich) amorphous silicon alloy, such as silicon nitride, silicon carbide, silicon oxide, or silicon oxynitride, or alternatively tantalum oxide, the behaviour of such materials in this respect being well known. Such materials have been employed in two terminal non-linear device applications such as thin film diodes, (TFDs), which term is used herein to include MIM (metal-insulator-metal) devices, used as bi-directional, two-terminal switching elements in active matrix display devices and the like. These materials are normally insulating but their conductivity is a strong function of applied electric field. They exhibit a threshold characteristic and start to conduct once the voltage thereacross reaches the threshold level (of either polarity). Of these materials, non-stoichiometric, (silicon-rich) hydrogenated amorphous silicon nitride is particularly preferred in view of the highly controllable, and predictable, non-linear characteristics of this material. Known non-linear materials other than those specifically mentioned and used for similar purposes and including certain polymers could also be suitable.

In one preferred embodiment, the grounding conductors are provided below the sensing surface and each sense electrode is associated with second electrode which is carried on the sensing surface overlying the sense electrode and whose edge is in close proximity to a grounding conductor, and at least the region of the dielectric layer between the grounding conductors and the sensing surface comprises said semi-insulating material. With this structure, any voltage excursion on the second electrode beyond a predetermined threshold level and resulting from a charged finger or the like touching or approaching that electrode will cause the impedance of the non-linear material between the electrode and a grounding conductor to fall allowing the charge to be conducted therethrough to the grounding conductor. Preferably, the edge of the second electrode is arranged to overlap a grounding conductor. At the overlap region a conductor/non-linear-dielectric/conductor structure similar to that of known thin film diodes is obtained with the thickness of the non-linear material between the two conductors corresponding to the thickness of the upper portion (sub-layer) of the dielectric material. As this thickness determines the threshold level and can be well-defined in the deposition processes used, the operational characteristics of the thin film diode structure formed thereby, and especially its threshold level, can easily be made to be highly controllable and predictable.

In another preferred embodiment the grounding conductors are carried on the sensing surface and the material of the dielectric layer between the sense electrode and the sensing surface comprises said semi-insulating material. In this structure, the dielectric layer becomes conducting once the voltage across it rises above a critical, threshold, value, and so when the voltage on the sense electrode increases to an excessive level, as a result of the effects of electrostatic charges on a person's finger, the charge is conducted away through this layer to the grounding conductor. The increase in the voltage on the sense electrode can be caused by capacitive coupling effects upon an electrostatic charge being present at or near the sensing surface or by actual breakdown of the dielectric material allowing such charge to pass to the electrode. The level at which this charge is conducted to a grounding conductor is selected to be below a level at which damage can be caused to a switching device coupled to the sense electrode.

In both preferred embodiments, therefore, voltage excursions occurring on the sense electrodes are limited, and consequently the risk of damage being caused to components connected electrically thereto is minimised. At lower voltages, impedance to ground via the semi-insulating material is comparatively very high so normal operation of the device is unaffected.

The grounding conductors may extend linearly between adjacent rows or columns of the sense electrodes. Preferably though, the grounding conductors are provided in the form of a grid with each sense electrode being surrounded by a grid portion.

Although the invention is particularly beneficial in capacitive type fingerprint sensing devices of the kind for example described in U.S. Pat. No. 5,325,442, it of course can be beneficially applied in other kinds of capacitive sensing array devices where similar problems with electrostatic charge may be experienced.

BRIEF DESCRIPTION OF THE DRAWINGS

Embodiments of capacitive sensing array devices, and more particularly fingerprint sensing devices, in accordance with the present invention will now be described, by way of example, with reference to the accompanying drawings, in which.

The figures are merely schematic and have not been drawn to scale.

The same reference numbers are used throughout the figures to indicate the same or similar parts.

DESCRIPTION OF THE PREFERRED EMBODIMENTS

Figure 1:
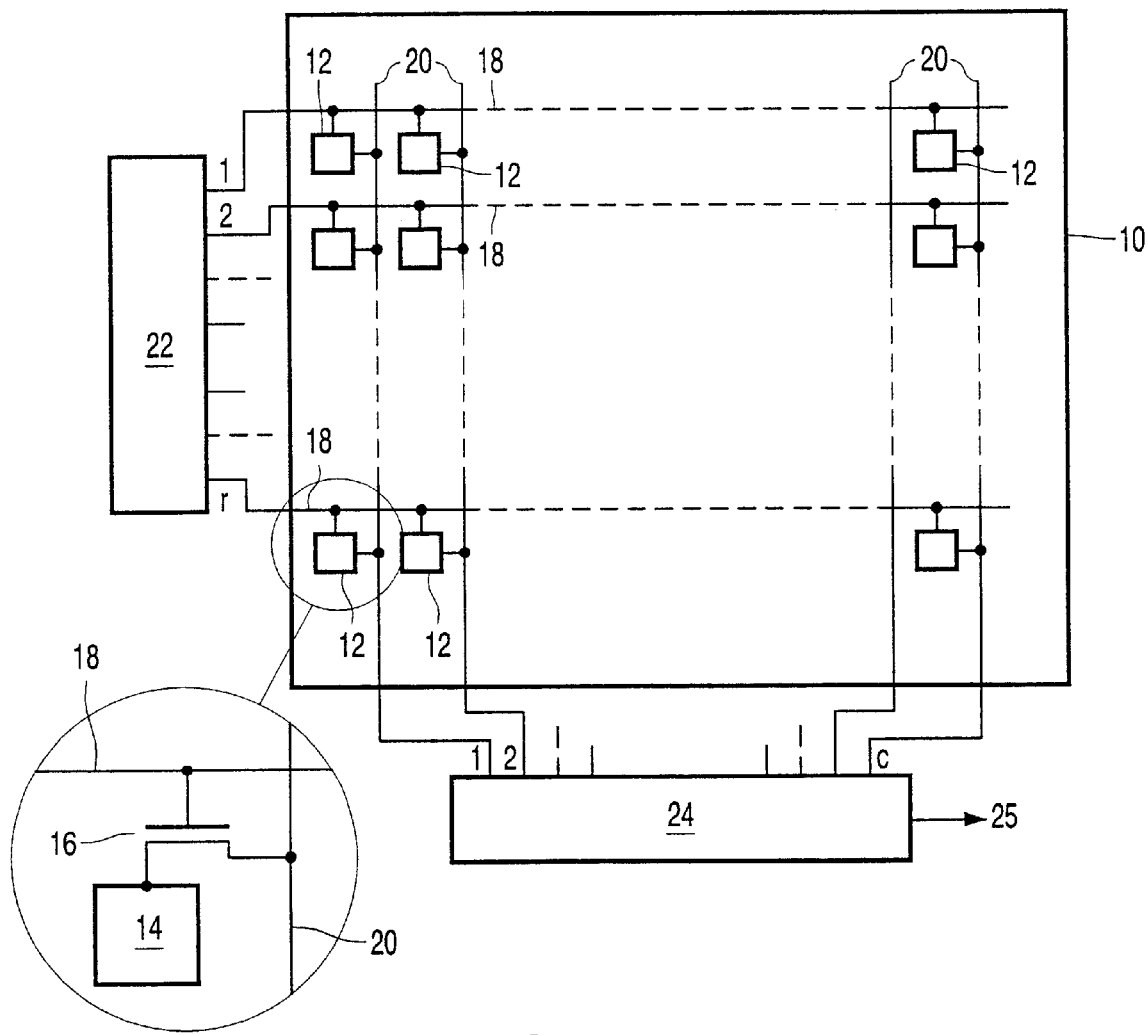
FIG. 1 is a simplified schematic diagram of a known capacitive fingerprint sensing array device.

Referring to FIG. 1, the capacitive fingerprint sensing array device is of the kind described in U.S. Pat. No. 5,325,442 to which reference is invited for a detailed description of its construction and operation. Briefly, the device comprises an active matrix addressed sensing pad 10 having an X-Y array of regularly-spaced sense elements 12 consisting of r rows (I to r) each with c sense elements, which are operable to scan a fingerprint. Only a few rows and columns are shown for simplicity but in practice there could be around 512 rows and columns of sense elements occupying an area of approximately 2.5 cms square.

In this particular embodiment each sense element of the array comprises a sense electrode 14 connected to a switching device comprising a three terminal switching device 16 in the form of an n-type field effect transistor (FET). The X-Y array of sense elements is addressed via a set of regularly-spaced row (selection) address conductors 18 and a set of regularly-spaced column (sensing) address conductors 20 with individual sense elements being located at respective intersections of the two sets of conductors. All sense elements in the same row are connected to a respective, common, row conductor 18 and all sense elements in the same column are connected to a respective, common, column conductor 20. The row conductors 18 are connected at their one ends to a row drive circuit 22, comprising a digital shift register circuit, and the column conductors 20 are connected at their one ends to a sense circuit, 24. The gate electrode of the FET 16 of each sense element in one row is connected to the common row conductor 18, while its drain is connected to the sense electrode 14 and its source is connected to the column conductor 20.

The sense elements 12 and address conductors 18 and 20 of the pad 10 are fabricated using standard thin film technology as used in active matrix addressed display devices for example, involving the deposition and definition by photolithographic processes of a number of layers of conductive, insulating, and semiconducting materials on an insulating substrate, and as such it is not thought necessary to describe here the manner of fabrication in detail. The electrodes 14 and sets of address conductors 18 and 20 can be formed of metal and the FETs 16 can be formed as amorphous silicon or polycrystalline silicon thin film transistors (TFTs) using an appropriate insulating substrate e.g. of glass, polymer, or quartz. More than one switching device may be used in each sense element, for example as described in EP-A-0836417 (PHB 34068). The switching devices need not comprise FETs but could instead be diode structures, for example thin film p-i-n devices or other two terminal non-linear switching devices connected between the row conductor and the sense electrode, as described in EP-A-0920669 (PHB 34153). While it is preferred to use thin film device technology, it will be appreciated that the sensing pad 10 could alternatively be fabricated as a chip using a (Si) semiconductor wafer and integrated circuit technology.

In accordance with the present invention, the structure of this known device is modified so as to prevent damage being caused due to electrostatic charge from the body of a person touching, or being in close proximity to, the device.

Figure 2:
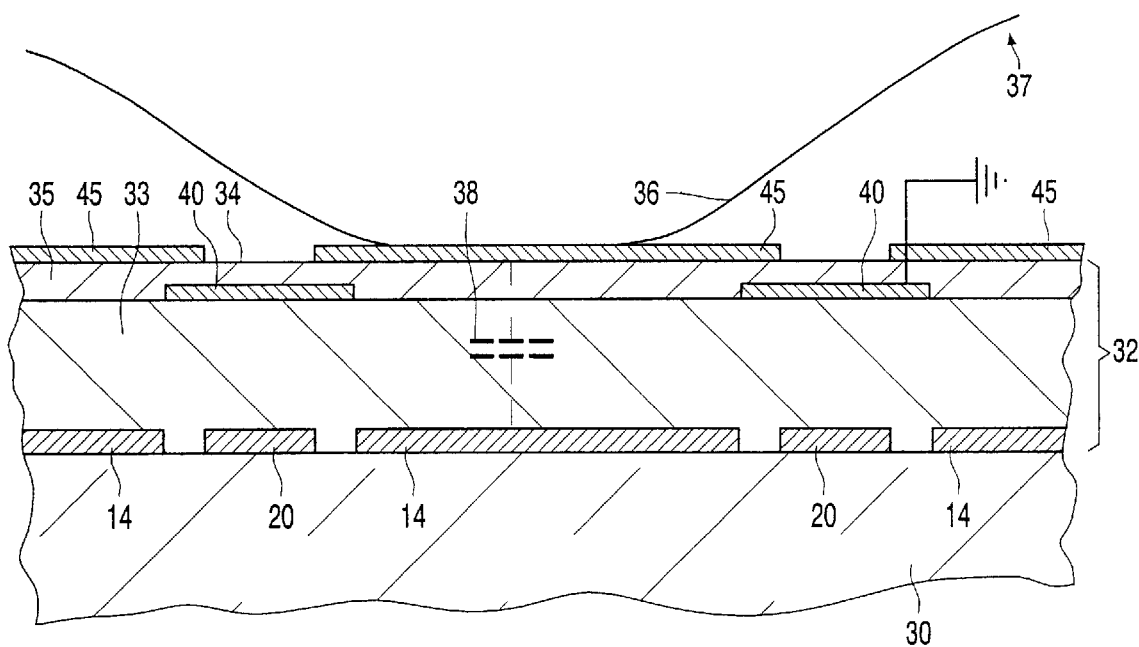
FIG. 2 is a schematic, cross-sectional, view through a representative part of one embodiment of a capacitive sensing array device in accordance with the present invention.
Figure 3:
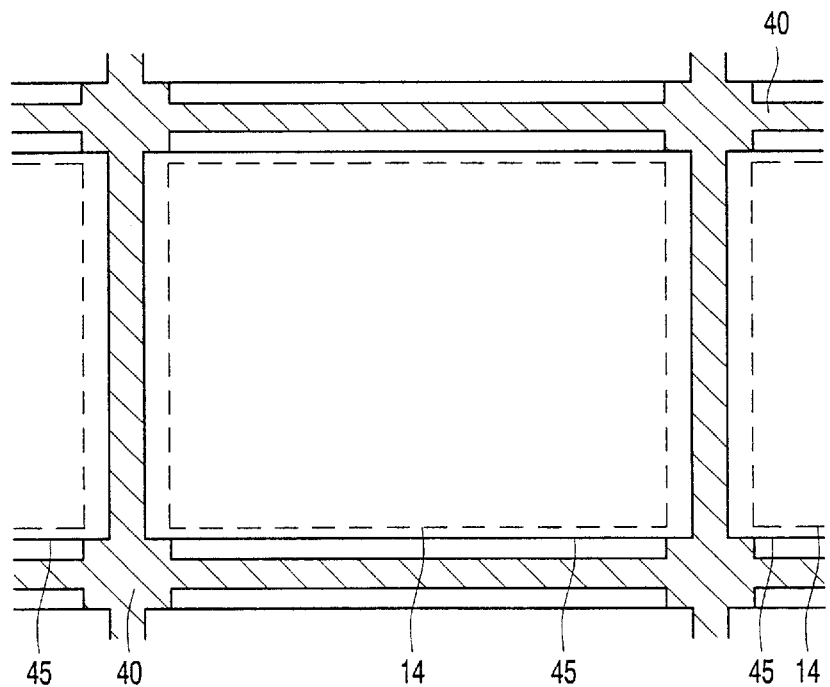
FIG. 3 is a plan schematic view of part of the sensing array device of FIG. 2.

FIG. 2 is a schematic cross-sectional view through a representative part of the sensing device structure in one embodiment of such a modified device according to the present invention and FIG. 3 is a schematic plan view of a part of this modified device.

The part of the device structure illustrated in FIG. 2 comprises one complete sensing element, the other sense elements of the array being constructed in substantially identical manner. The TFT switching devices 16, which are not visible in this section, are formed on an insulating substrate 30 from a deposited layer of amorphous or polycrystalline silicon material, constituting the TFTs' channels, with a deposited layer of dielectric material, for example silicon nitride, constituting the gate insulator layers of the TFTs. The sense electrodes 14, comprising regularly spaced and equally sized rectangular conductive pads, and the set of address conductors 20 extending therebetween are defined from a common deposited metal layer. Integral extensions of the electrodes 14 respectively form the drain contacts of the TFTs 16 and integral extensions of the conductors 20 form the source contacts of the TFTs. Insulating material is provided between the conductors 18 and 20 at the regions where they intersect. The set of row conductors 18, not visible in FIG. 2, is formed from a deposited metal layer with each row conductor extending between adjacent rows of sense electrodes 14 and having integral extensions spaced along its length which serve as gate electrodes of the TFTs 16.

To complete the basic structure of the sensing device, a layer of dielectric material 32 of a predetermined thickness is deposited completely over the sense element array structure on the substrate 30 to provide a continuous sensing surface 34 spaced from, and substantially parallel to, the substrate surface.

The physical dimensions of the sense electrodes 14 are chosen in accordance with the desired resolution characteristics in fingerprint sensing. By way of example, the sense electrodes may have a pitch of around 50 to 100 micrometres in both the row and column directions. The thickness of the dielectric layer 32 is selected taking into account the value of the relative permittivity of the material used and, for example, in the case of the material having a relative permittivity of approximately 6, a film thickness of around 0.1 micrometres may be used, with a sense electrode around 50 micrometres square.

The dielectric layer 32 is composed of a lower insulating film 33 of, for example, silicon nitride or a polyimide, and an upper, comparatively thin, film 35 providing a continuous surface sub-layer extending immediately adjacent the sensing surface and between the sensing surface and the level of the sense electrodes. The material of the sub-layer 35 comprises a semi-insulating material having a highly non-linear current-voltage characteristic. In this example, the material comprises a non-stoichiometric, silicon-rich, hydrogenated amorphous silicon alloy, and more particularly a silicon nitride alloy, (a-SiNx) whose formation is entirely compatible with the thin film fabrication of the underlying circuitry. Such a layer can readily be formed using standard CVD thin film deposition processes. Alternatively, other known non-linear materials such as silicon-rich amorphous silicon oxide, silicon carbide, or silicon oxynitride, or tantalum (pent-) oxide or certain polymers could be used. Materials of this type have been used in thin film diodes and MIM structures used as switching devices in AMLCDs, and examples of these devices used for such purposes are described in the paper entitled "Active Matrix LCD addressing with Two-Terminal Devices" by J. Shannon in ITG-Fachbericht, Vacuum Electronics and Displays, VDE-Verlag, Berlin, Vol. 132, pps 291–298, 1995, to which reference is invited for further details.

Prior to the deposition of the layer 35, there is provided directly on the surface of the layer 33 a grounding conductor line structure 40. In this example the conductor line structure comprises a conductive grid of deposited metal with portions of the grid extending alongside the rows and columns of sense elements at the regions of the surface of the layer 33 overlying the spaces between the sense electrodes 14 and with each grid cell completely surrounding a respective sense electrode. Alternatively, however, the conductor line structure may be provided as a set of linear conductors extending over the spaces between adjacent rows, or columns, of sense electrodes, for example with each conductor line overlying a respective row or column address conductor. In operation of the device, the conductor line structure is held at ground potential of the sensing device electronics.

At the location of each sense electrode 14, there is also provided directly on the upper surface of the layer 35 a second electrode 45 which is of similar shape to, but slightly larger than the underlying sense electrode 14 and aligned vertically therewith. The second electrodes 45 are formed as discrete, electrically isolated, conductive pads.

The conductor line structure 40 and the array of second electrodes 45 are formed by appropriately patterning photolithographically layers of metal or other suitable conductive material deposited over the surface of the layers 32 and 35.

As can be seen from FIGS. 2 and 3, the second electrode 45 extends at two opposite sides over parts of the grid structure 40. The electrode 45 could be arranged so as to extend over the adjacent horizontal arms of the grid structure 40 as well or instead. At each of the regions of overlap between the second electrode 45 and portions of the grid structure there is defined a form of thin film diode structure comprising the overlying conductive parts and a portion of the semi-insulating film 35 sandwiched therebetween. Typically, the thickness of this layer 35 can be between 30 and 300 nm. This diode structure provides a highly non-linear impedance between the second electrode 45 and the grounding grid 40 and exhibits a bidirectional, threshold, (switching), characteristic in response to the voltage difference between these two parts reaching a certain value, for example between around 5 and 50 volts for the layer 35 thickness range mentioned. At low voltages on the electrode 45 below this threshold level, the impedance to ground is very high and normal operation of the device is unaffected.

The switching operation of the diode structure is completely reversible and the material 35 reverts to its initial, insulating, state upon removal of the voltage.

In operation, a finger whose print is to be scanned is placed on the sensing surface 34. Physical contact with the a second electrode 45 then occurs at the ridges of the fingerprint, as illustrated in FIG. 2 where one ridge 36 of part of the finger surface 37 is depicted, which grounds the electrode 45. Troughs in the fingerprint profile are spaced from the surface 34 and the second electrode 45 by a considerably greater distance. The ridged finger surface is therefore spaced from the array of electrodes 14 by a minimum distance determined by the thicknesses of the thin film 32 and the electrodes 45. Each sense electrode 14 and either the respective overlying portion of the finger surface at troughs or the electrode 45 at ridges form opposing plates of a capacitor 38, as depicted by dotted lines in FIG. 2, with the upper plate, constituted by the finger surface portion or the electrode 45, normally being effectively at ground potential. The capacitances of these individual capacitors varies as a function of the spacing between the finger surface and the sensing surface 34, with larger capacitances occurring where the fingerprint ridges are in contact with the electrode 45 and smaller capacitances occurring where the troughs in the fingerprint overlie the sense electrodes 14. The variation in capacitances produced over the array of sensing elements 12 of the pad 10 by a fingerprint ridge pattern thus provides an electronic image of the fingerprint surface.

These capacitances are sensed within the sensing device and an output provided indicative of the variation, and hence the pattern of the fingerprint. The actual sensing of the capacitances of the individual sense elements 12 in the array is accomplished in a manner as described in the aforementioned patent specifications to which reference is invited for further information.

The grid structure 40 and the second electrodes 45 together with the intervening layer 35 serve to prevent, or at least reduce, the possibility of electrostatic damage being caused to the switching devices of the sense elements when the sensing array is being used by a person who has acquired a significant electrical charge, and which charge could otherwise be discharged into the switching devices. In the known device, any charge on a person's finger as it touches or approaches the sensing element array is likely to be discharged into the sense electrode, and hence to the associated switching device. Such charge could instead induce a high voltage on the sense electrode through capacitive coupling. The arrangement depicted in FIGS. 2 and 3 is intended to ensure that any voltage excursion on a sense electrode 14 is limited. To this end, the charge on a person's finger is either discharged directly to the grounding grid 40 through the thin overlying portion of the layer 35 or may be collected on the second electrode 45. When the voltage on the second electrode 45 rises due to electrostatic discharge and reaches a certain level, the impedance of the layer 35 at the regions of overlap with the grounding grid 40 particularly falls and the charge is conducted away through the layer 35 at those regions to the grounding grid structure, thereby limiting any voltage excursion on the sense electrode. Once the charge is conducted away, the layer 35 reverts to its former, insulating, state and no damage is caused to this material.

The operation in this respect of the thin film diodes effectively formed at the overlap regions is highly controllable, principally by way of the composition of the layer 35 and its thickness, and so the conduction of charge from the electrode 45 can be achieved in a highly reliable and predictable manner.

In normal operation, when no fingerprint ridge is present on the second electrode 45, then this electrode floats and the capacitance between the sense electrode 14 and ground is relatively low. When a fingerprint ridge touches the second electrode 45, the electrode is effectively grounded via the finger impedance and the capacitance to ground increases, as in the known sensor device.

Figure 4:
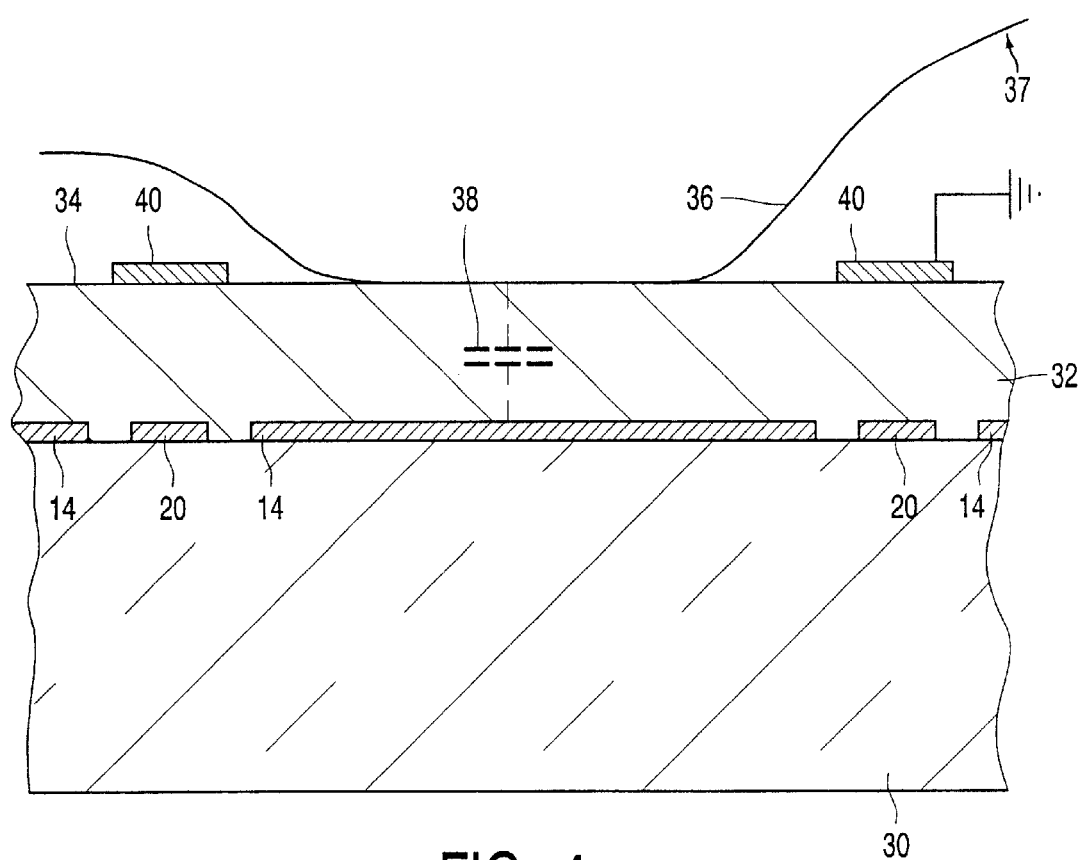
FIG. 4 is a schematic, cross-sectional view through a representative part of a second embodiment of sensing array device in accordance with the present invention.

FIG. 4 illustrates schematically in cross-section a representative part of another preferred embodiment of sensing array device according to the invention. As shown a single layer is used for the dielectric layer 32 and the grounding grid structure 40, which is of generally similar construction and positioning with respect to the sense electrodes 14 to that of the previous embodiment, is carried directly on the surface of this layer, i.e. the sensing surface 34. In this embodiment, the dielectric layer 32 is formed entirely of a semiconducting, highly non-linear current/voltage characteristic material, such as those described previously which material extends between the sensing surface 34 and the level of the sense electrodes 14. The operation of this sensing device in sensing fingerprint patterns is generally similar to that of the devices described in the aforementioned patent specifications.

The grounding grid 40 serves to dissipate electrical charge carried on a persons finger when the finger touches the grid or when, upon the finger approaching the sensing surface, the charge jumps towards a region of the sensing surface occupied by the grid. In the event though that such charge is not conducted away by the grounding grid directly but reaches the sense electrode 14, then as the voltage difference caused between the electrode 14 and the grounding grid rises towards a predetermined, critical threshold level below that which could otherwise damage components connected to the electrode 14, the impedance of the intervening semiconducting material falls and the charge is conducted away through this layer to the grid. Again, therefore, the extent of the voltage excursion on the sense electrode due to electrostatic charges is limited. The switching nature of the layer 32 is fully reversible and upon the charge being conducted away and the voltage across the non-linear material disappearing, the material returns to its former, insulating, state.

In a modification to this embodiment, only an upper surface region of the dielectric layer 32 may be formed, as a sub-layer, from the highly non-linear material, the remainder of the layer 32 being of conventional dielectric material.

Figure 5:
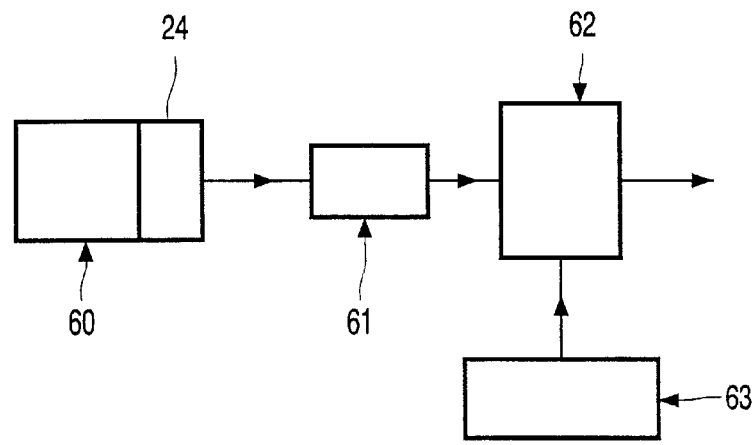
FIG. 5 illustrates in simple block diagram form a fingerprint recognition system using the sensing devices of FIGS. 2 and 4.

FIG. 5 shows in schematic block form a fingerprint recognition system incorporating the sensing device, here represented by the block 60. The system includes means responsive to an output from the sensing circuit of the device to provide characteristical data, according to the sensed capacitances, of a sensed fingerprint, and means for comparing said characteristical data with stored characteristical data for one or more fingerprints. If required, the output obtained from the sensing device is provided in a form comparable to the video output provided by an image sensor in known optical fingerprint sensing devices. Accordingly, and as will be apparent to skilled persons, components of the system, other than the sensing device, can be generally of the kind employed in systems using optical sensing devices. The characteristical data may take the form of information regarding the orientation of ridge lines and relative positions of minutiae, that is, the endings and bifurcations of the lines. The processing of information obtained from the sensing device to produce and compare characteristical data can follow known schemes and techniques. Verification could be obtained by making use of topological features in addition to the spatial positions of minutiae, although of course use may be made only of information in respect of the two-dimensional ridge patterns to simplify the processing necessary if less accuracy is acceptable. Briefly, the output from the device 60, suitably conditioned, is fed to an analysis circuit 61 which is programmed to detect the characterising features of the fingerprint. Data from the circuit 61 is supplied to a computer 62 which through standard algorithms compares the data with data for a plurality of fingerprints, or a single fingerprint depending on whether the system is used for identification or merely verification purposes, held in a storage device 63 and which provides an output in accordance with whether or not a match has been found.

The circuit 61 is programmed to utilise, with appropriate discrimination to select particular output signal values from the device 60, specific information representative of the two dimensional ridge pattern in the nature of a binary image similar to that obtained from known optical sensing devices.

From reading the present disclosure, other modifications will be apparent to persons skilled in the art. Such modifications may involve other features which are already known in the field of fingerprint sensing and component parts therefor and which may be used instead of or in addition to features already described herein.

What is claimed is:

1. A capacitive sensing array device having a structure comprising an array of sense electrodes carried on a substrate and covered by a layer of dielectric material defining a sensing surface, said capacitive sensing array device further comprises grounding conductors adjacent to the sensing surface and extending alongside at least three edges of each of the sense electrodes, and the material of the dielectric layer at least at the region of the grounding conductors comprises a semi-insulating material having a non-linear current-voltage characteristic whereby electrostatic charges transferred to, or induced in, the device structure in use are conducted through the semi-insulating material to the grounding conductors.

2. A capacitive sensing array device according to claim 1, wherein the grounding conductors are provided below the sensing surface and each sense electrode is associated with a second electrode which is carried on the sensing surface overlying the sense electrode and whose edge is in close proximity to a grounding conductor, and at least the region of the dielectric layer between the grounding conductors and the sensing surface comprises said semi-insulating material.

3. A capacitive sensing array device according to claim 2, wherein the edge of the second electrode is arranged to overlap a grounding conductor.

4. A capacitive sensing array device according to claim 3, wherein the grounding conductors are carried on the sensing surface and the material of the dielectric layer between the sense electrode and the sensing surface comprises said semi-insulating material.

5. A capacitive sensing array device according to claim 1, wherein the non-linear, semi-insulating material comprises a non-stoichimetric, silicon-rich, amorphous silicon alloy.

6. A capacitive sensing array device according to claim 1, wherein the non-linear, semi-insulating material comprises tantalum oxide.

7. A capacitive sensing array device according to claim 1, wherein the grounding conductors are provided in the form of a grid with each sense electrode being surrounded by a grid portion.

8. A capacitive sensing array device according to claim 1, wherein each sense electrode is coupled to a switching device carried on the substrate beneath the layer of dielectric material and connected to an address conductor which underlies a grounding conductor.

9. A capacitive sensing array device according to claim 8, wherein the switching device comprises a thin film diode or transistor.

10. A capacitive sensing array device according to claim 1, wherein the sensing array device is a fingerprint sensing device.

11. A fingerprint sensing system comprising a fingerprint sensing device according to claim 10, means responsive to an output from the sensing device to provide characteristical data of a sensed fingerprint, and means for comparing said characteristical data with stored characteristical data for one or more fingerprints.

* * * * *